(12) United States Patent
Yu

(10) Patent No.: US 6,854,090 B2
(45) Date of Patent: Feb. 8, 2005

(54) METHOD AND APPARATUS FOR REACTIVATION OF A SYSTEM FEATURE BY USING A PROGRAMMABLE REACTIVATION BUTTON

(75) Inventor: Seong Ryol Yu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 10/105,114

(22) Filed: Mar. 21, 2002

(65) Prior Publication Data

US 2003/0179247 A1 Sep. 25, 2003

(51) Int. Cl.⁷ ............................................. G06F 13/00
(52) U.S. Cl. ....................................... 715/840; 715/856
(58) Field of Search ................................ 345/840, 856, 345/818, 830, 810, 819

(56) References Cited

U.S. PATENT DOCUMENTS

| 5,726,883 A | | 3/1998 | Levine et al. |
| 5,894,276 A | | 4/1999 | Altidor et al. |
| 5,916,310 A | * | 6/1999 | McCain ........................ 710/67 |
| 5,917,486 A | * | 6/1999 | Rylander ..................... 345/764 |
| 6,037,933 A | | 3/2000 | Blonstein et al. |
| 6,211,856 B1 | | 4/2001 | Choi et al. |
| 6,295,479 B1 | | 9/2001 | Shima et al. |
| 6,734,883 B1 | * | 5/2004 | Wynn et al. ................. 345/830 |

* cited by examiner

Primary Examiner—Cao Nguyen
(74) Attorney, Agent, or Firm—Robert H. Frantz; David A. Mims, Jr.

(57) ABSTRACT

An application program and system feature reactivation process and apparatus for use in a graphical user interface of a computer-based system. A user-selectable feature reactivation button is quickly defined or "programmed" through a first use, allowing subsequent reactivation of the system feature by simply operating the reactivation button while a pointer is located anywhere on the screen within a user input area. The reactivation button may be on a pointing device such as a mouse, trackball, trackpoint, keypad, stylus, etc. The invention eliminates the need to repeatedly relocated the pointer to a feature activation push button on the screen to and from the user input area, and eliminates excess user hand movement from the pointing device and the keyboard.

11 Claims, 6 Drawing Sheets

METHOD AND APPARATUS FOR REACTIVATION OF A SYSTEM FEATURE BY USING A PROGRAMMABLE REACTIVATION BUTTON

BACKGROUND OF THE INVENTION

1. Field of the Invention

This invention relates to the arts of user interfaces and operator controls for systems, computers, and application programs. More specifically, this invention relates to the arts of user-definable keys and buttons for repeating system functions, actions or features.

2. Background of the Invention

Graphical user interfaces are common place on computer based systems such as personal computers, personal digital assistants ("PDA"), and other types of computerized equipment. A graphical user interface ("GUI") consists of several basic elements including a user display area which provides one or more user selectable areas on the screen. The user selectable areas usually appear as three-dimensional button, checkboxes, fillable forms, slider controls, or drop-down lists.

Turning to FIG. 3, an example of typical graphical user interface is shown, in this case a word processor. This user interface for the word processor is usually displayed on a portion (31) of a computer screen, in which a GUI frame (33) contains a user input area (37), a tool bar (32) having several "buttons", and a set of drop down menus (34) or menu bar. A pointer (35) indicates to the user where the pointing device is currently positioned, and a cursor entry point (36) may also be provided.

If the pointer (35) is moved over one of the drop-down menu headers (34), such as the FILE header, and if the pointer is activated, such as by pressing the left button (e.g. "left clicking") on a mouse, a drop-down menu having several options is usually displayed.

If the pointer (35) is moved above one of the buttons on the toolbar (32), and the pointer is activated such as by left clicking the mouse, the system feature or action represented by that button will be activated.

In this example, several different drop-down menus including FILE operations, EDIT commands, VIEW controls, selection of various TOOLS, and a HELP menu are available. Also, in the toolbar (32) are a number of common buttons, as found in many word processors, including (from left-to-right) a BOLD button, an ITALICIZE button, an UNDERLINE button, a LEFT justification button, a CENTER justification button, a RIGHT justification button, a spell checker button, a hyperlink definition button, a color control button (shown as a paint can pouring into a character), a font size increase button, and a font size decrease button.

In the user input area (37), a cursor (36) is usually provided so that the user will know where the typing will begin if he begins to type on the system's keyboard. When text is already present in the user input area (37), the user may use the pointer (35) to click anywhere in the text to reposition the cursor input point (36).

The user can also usually select a block or section of text by positioning the pointer (35) at the beginning of the text to be selected, clicking and holding down a mouse button while moving the mouse to cover the entire block of text of interest ("click and drag"). This typically causes the text to be displayed in a special manner to indicates its selection, such as reverse video, change of color, or other visually distinctive markings. Once text has been selected, it may be operated on in group such as by deleting it, replacing it, or changing its characteristics (bolding, underlining, etc.).

Turning to FIG. 4, an example is given of text in a word processor which is input by the user and then manipulated using system features. In this example, the text "A Long Time Ago" has been typed into the user input area (37). The user has used the BOLD system feature, font size increase feature, and the center justification feature to yield the distinctive appearance of a title of the document.

Similarly, the user has entered the text "by Steve Yu", centered it, and italicized it. Also, the user has entered text "Once upon a time," leaving the cursor (36) following the comma of this phrase.

The user's motions and actions made to activate a single system feature on a block of text are illustrated by the process of FIG. 5 in a conventional system such as a personal computer with a keyboard and mouse (or trackball). First, the user moves (52) a hand from the keyboard to the mouse, and then maneuvers (52) the pointer over the text and selects the word or phrase. Next, the user moves the pointer (35) across the screen to the feature activation GUI button, such as the ITALICIZE button on the toolbar (32), and left-clicks (53) on the GUI icon by pressing a left button on the mouse.

If the user has selected a drop-down menu, he may have to maneuver (54) the pointer one or more additional times to select options on the menu and/or options on submenus. The user may then move (56) the pointer to a point within the user input area (37) such as the text document being edited, and click at a point where resumption of editing is desired. Finally, the user moves (57) his hand from the mouse back to the keyboard to resume typing.

When the user desires to activate another system function, such as applying a "bold" characteristic to a block of text or changing the justification of a paragraph, he must repeat (58) this process (50).

This process becomes tedious when the user is activating the same system feature repetitively. For example, if the user has decided to change many section headings in a document to have characteristics including bold, underline, and large size, he will have to perform a great number of steps. If there are 30 headings to be changed, for example, he may have to perform as many as 180 steps (30 iterations of the process of FIG. 5). This can contribute to operator fatigue, increase errors, and even increased wrist, arm and back strain, over time.

An existing solution to this tedious and repetitious process uses a combination of keys on the keyboard (e.g, Ctrl+I or Ctrl+B) to activate a feature directly. The key combination is commonly referred to as a hot key sequence or keyboard shortcut. A given feature may be activated repeatedly by pressing on the same combination of keys. In this well-known solution, the mouse is used to perform the text block selection, and then the key combination is pressed to activate the feature. As this is still a keyboard and mouse combination, the user's hand is required to move from keyboard to mouse and back to keyboard essentially the same number of times per operation. Further, most programs only provide a few keyboard shortcuts or hot key sequences for the most commonly used program features, and these sequences may not be intuitive to the user (e.g. Ctrl-A for "File-Save As").

Some word processors provide a macro definition or recording function which allows a user to record a series of keystrokes, and then to replay those series of keystrokes upon selection of the assigned macro. Most word processors provide this capability, although many of them are not easy to use and many users are not familiar with their operation. Because of their relatively difficult user interfaces to define a macro and run it, most users opt for the "brute force" approach of repeating a series of manual steps, such as those just discussed.

Additionally, some personal computers and computer-based devices provide programmable function keys, such as special keys located on the side of the mouse, and special keys located on the keyboard. Similar to the macro function definition capabilities of a particular program, the firmware driver for these devices such as the keyboard driver or the mouse driver allow the user to define what actions will be performed when a special key is selected by the user, such as running a program, performing a series of keystrokes, or executing a special function (scrolling, magnification, etc.). However, the configuration of these options can be quite difficult, and as such, many users do not take advantage of them. Further, the operation of these special buttons are usually associated with a device, such as the mouse or the keyboard, and are not associated with a specific application program. In such a case, a user may configure the special button on a mouse to italicize text (e.g. entering the keystrokes Control-I). But, this operation may not be a valid operation within another application program, such as a web browser, rendering the programmed button useful only in a word processor.

Therefore, there is a need in the art for an improved user interface system and method which allows a user to take advantage of programmable keys on common user input devices, such as mouse or keyboard, while providing a quick, simple, and intuitive process of programming or defining the functions of those programmable keys so that reactivation and repeated use of a system feature may be realized to improve user interface efficiency.

SUMMARY OF THE INVENTION

The invention provides the user the ability to "reactivate" a program or system feature using a designated user control such as a button on a mouse. The feature reactivation button is quickly defined or "programmed" through a first use, allowing subsequent reactivation of the system feature by simply operating the reactivation button while a pointer is located anywhere on the screen within a user input area.

The reactivation button may be on a pointing device, such as a mouse, trackball, trackpoint, keypad, stylus, etc., or may be a special keyboard key or other user-operable control.

The invention eliminates the need for a user to repeatedly move the system pointer between a program feature activation area (e.g. menu bar or toolbar area) and a user input area in a graphical user interface. This allows the user to keep the pointer in the user input area of the graphical user interface, and it eliminates excess user hand movement from the pointing device and the keyboard, thereby increasing the efficiency of the user interface, decreasing operator errors, and reducing operator fatigue.

BRIEF DESCRIPTION OF THE DRAWINGS

The following detailed description when taken in conjunction with the figures presented herein provide a complete disclosure of the invention.

DETAILED DESCRIPTION OF THE INVENTION

This invention allows quick and intuitive reactivation of a program feature in a graphical user interface in a system such as a personal computer, PDA, wireless telephone, and the like. It provides a method and apparatus for programming a reactivation button that can be used to reactivate a program feature while the pointer is located away from the normal GUI control (menu, button, etc.) for the feature. The reactivation button itself is preferably located on a pointing device such as a mouse (e.g. right mouse button), or it may be any other suitable keyboard key or user-operable control.

The use of the reactivation button eliminates the need to physically move the pointer to a feature activation push button on the screen, such as a BOLD or ITALICIZE button in a word processor. By using the invention, the user's hand movements between keyboard and pointing device are also minimized, thereby increasing the efficiency and productivity of the user and minimizing user fatigue.

The advantage of this invention is greatest when a system feature must be activated repetitively, such as when many separate text blocks in various locations in a document need to be italicized, for example, or spell checked, specially formatted, underlined, etc. After programming the feature reactivation button, the same program feature can be activated repeatedly with a simple click of the reactivation button, without having to move the pointer each time to the feature activation push button on the screen such as buttons in a toolbar area or options on a drop-down menu.

The invention is preferably realized as a process in common software such as word processors, web browsers, spreadsheets, email clients, personal information and contact managers, etc. It may be realized as direct, inline changes to the native code of such programs, or it may be realized as an extension such as a dynamic linked library ("DLL") or plug-in function. The software which implements the process of the invention must be able to determine the context of the user interface, including details such as where the pointer is located within the GUI display frame of the program (e.g. over a toolbar button, over a drop-down menu option, or within a user input area).

As such, the invention is realized on a computing platform. Therefore, it is useful to review a generalized architecture of a computing platform which may span the range of implementation, from a high-end web or enterprise server platform, to a personal computer, to a portable PDA, web-enabled wireless phone or other microprocessor-based system.

Figure 1:
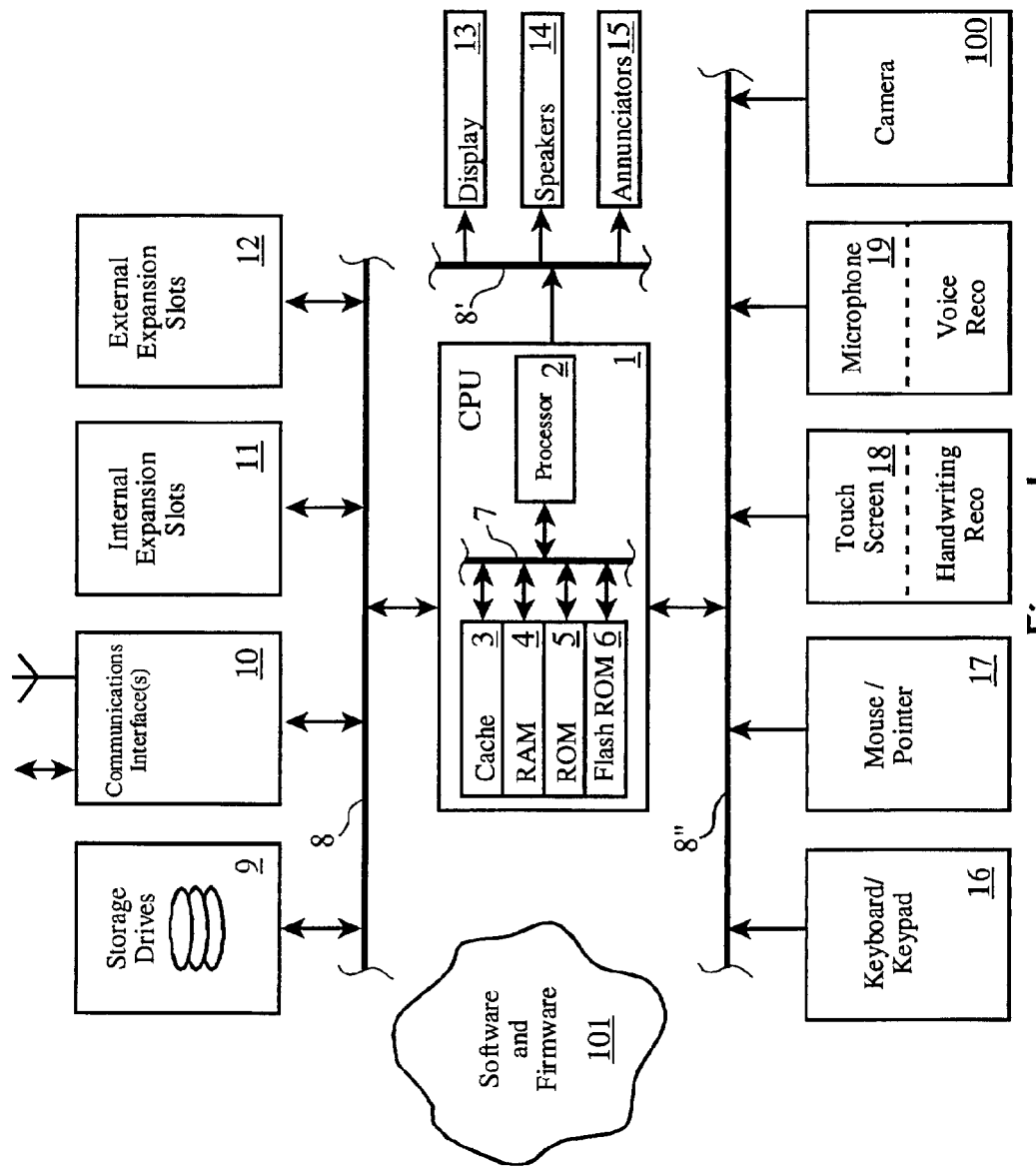
FIG. 1 depicts a generalized computing platform architecture, such as a personal computer, server computer, personal digital assistant, web-enabled wireless telephone, or other processor-based device.

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or fall motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc.

The computing platform is also provided with one or more software and firmware (101) programs to implement the desired functionality of the computing platforms.

Figure 2:
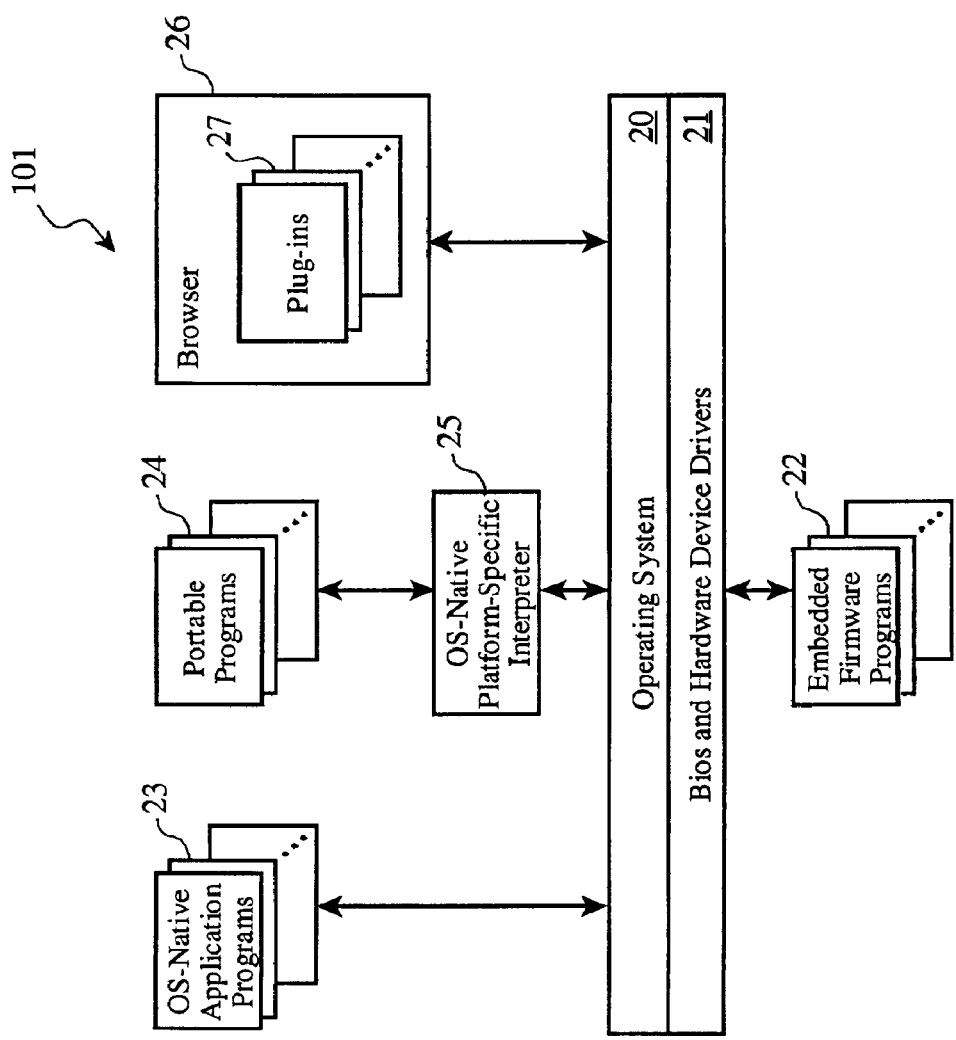
FIG. 2 shows a generalized organization of software and firmware associated with the generalized architecture of FIG. 1.
Figure 3:
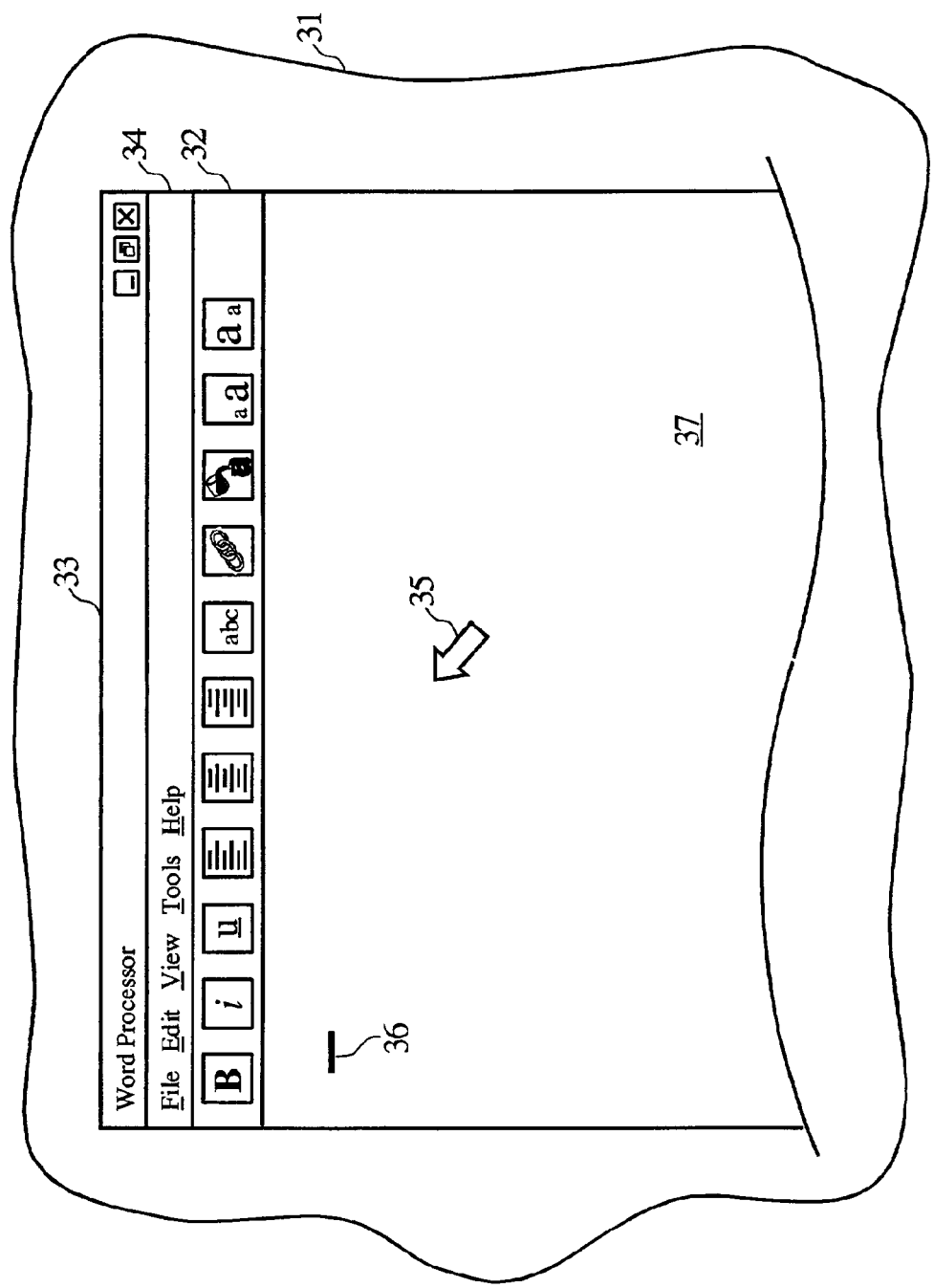
FIG. 3 shows an example of a typical graphical user interface for a word processor.
Figure 4:
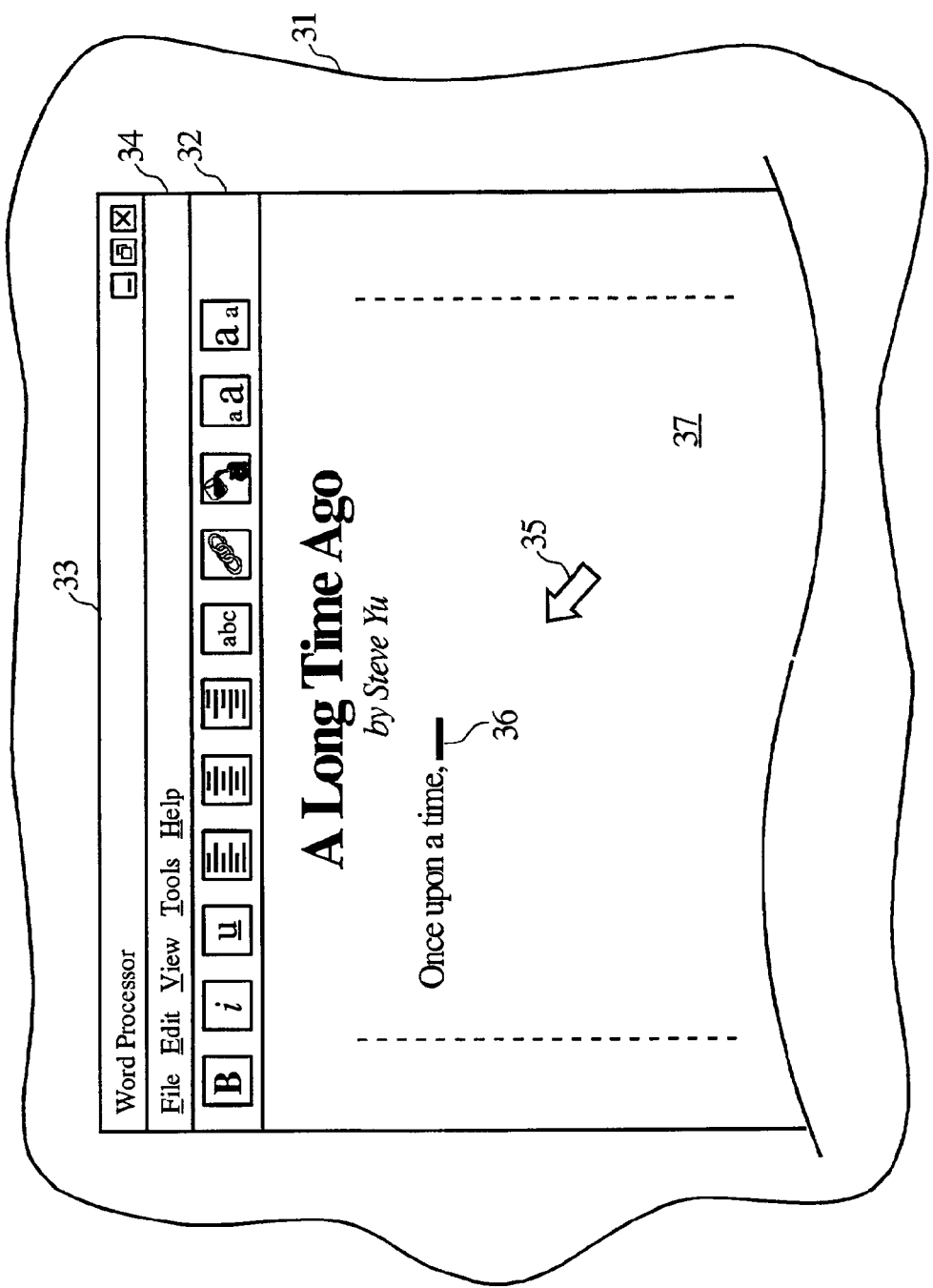
FIG. 4 shows another view of a typical graphical user interface for a word processor.
Figure 5:
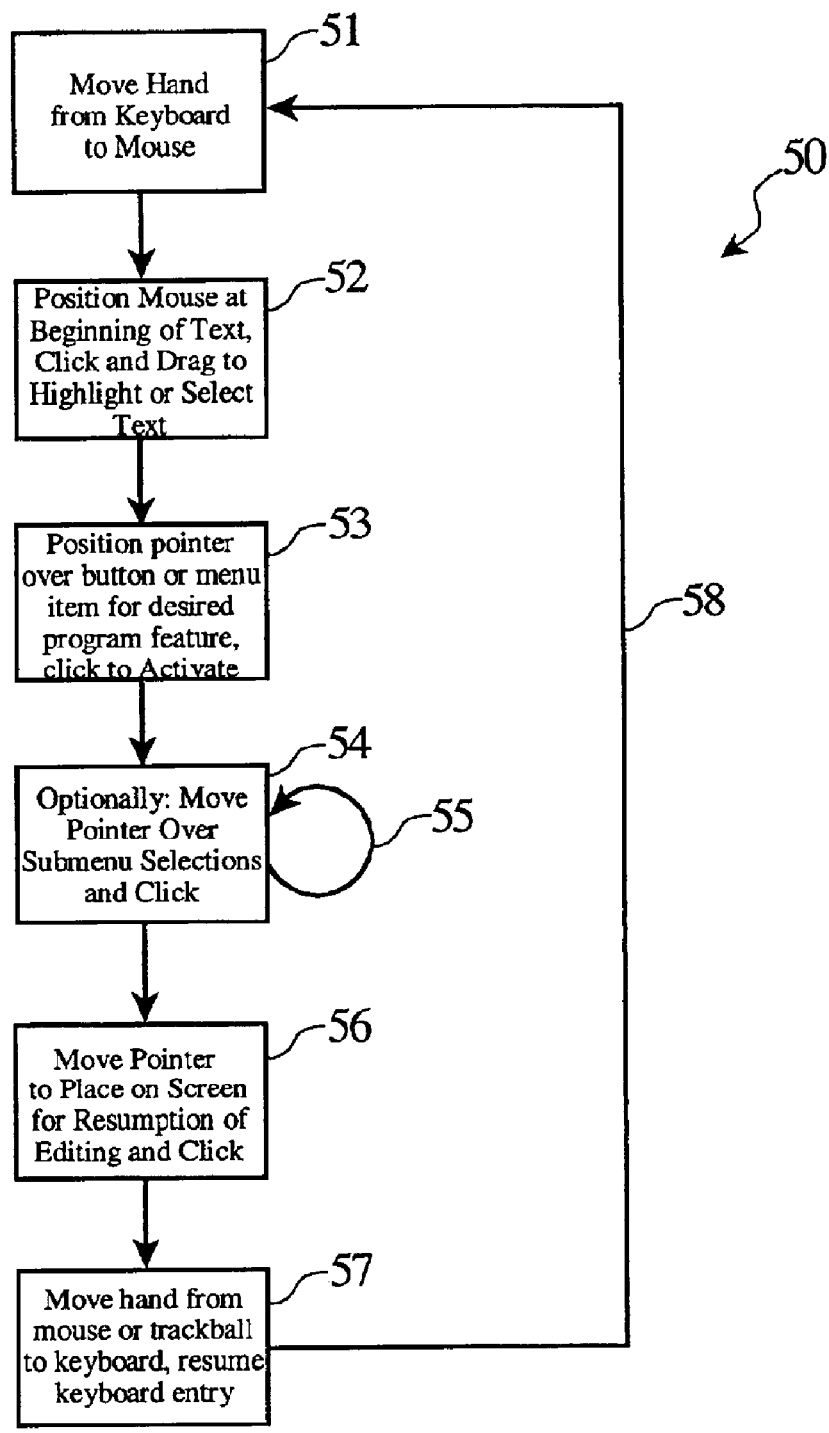
FIG. 5 illustrates the well-known process followed when operating a set of user-selectable program or system controls and making input to a user input area.

Turning to now FIG. 2, more detail is given of a generalized organization of software and firmware (101) on this range of computing platforms. One or more operating system ("OS") native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java™ scripts and programs.

Often, computing platforms are also provided with a form of web browser or microbrowser (26), which may also include one or more extensions to the browser such as browser plug-ins (27).

The computing device is often provided with an operating system (20), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

We now turn our attention to description of the method of the invention and it's associated components. It is preferrably realized as native program code within a particular program package, such as a word processor, which it is intended to benefit, and through which accesses and modifies certain system files and resources as described in more detail in the following paragraphs. The invention, however, may well be supplied as an extension or helper program, such as a plug-in or DLL.

The process of the invention allows the user to program the special feature reactivation button on a first-use of a system feature. To illustrate, we follow an example of italicizing some blocks of text in a word processor.

First, the user maneuvers the pointer over the first block of text, and selects the word or phrase. Next, the user moves the pointer to the ITALICIZE button on the GUI toolbar, and presses the special feature reactivation button to activate the italicization feature and to program the feature reactivation button.

Now, the user may move the pointer to the next block of text to be italicized, select it, and simply press the feature reactivation button without moving the pointer to the toolbar area. In an enhanced embodiment, the feature reactivation button may be used as the "click-and-drag" button, as well, to allow selecting and italicization in one click. Subsequent text blocks can be selected and italicized in one or two steps each until all blocks are italicized, thereby saving approximately 5 or 6 user actions per block of text modified.

This process, of course, can be used to operate any system feature available on the GUI interface such as other toolbar buttons and drop-down list options, including but not limited to:

- text format controls (bold, underline, italicize, font selection, size selection, color setting, super and subscript position setting, etc.)
- spell checking, thesaurus referencing
- setting text justification
- defining hyperlinks
- setting field, cell and table characteristics (borders, number formats, justification, colors, backgrounds, etc.).

Further, according to the preferred embodiment, multiple features may be appended, concatentated or aggregated for single-click operation, such as defining a combination of bolding, italicization, and centering.

Preferably, the feature reactivation button is programmed by moving the pointer to the push button, menu item, or other GUI system feature control, on the screen, and then clicking the reactivation button. The invention can be applied to pull-down menus, pop-up menus, or other common GUI control objects that can activate program features.

Once the reactivation button has been programmed, it can be used to activate the same program feature repeatedly, without having to reposition the pointer from the user input area to the control areas (toolbars, menu bars, etc.).

There are at least two scenarios of usage of the invention supported by the preferred embodiment. The first scenario uses a combination of the point device's normal select button (e.g. mouse left button) and the feature reactivation button. The select button is used to select the text to be modified, and the reactivation button is clicked to invoke the program feature, such as to italicize the selected text. The program feature is activated when the reactivation button is clicked while the pointer is anywhere on the screen, except over any GUI control that can activate another program feature. In this scenario, the reactivation button is automatically reprogrammed when it is clicked while the pointer is over a different GUI control for a program or system feature. The reactivation button is reset when it is clicked while the pointer is over the same object for which it was previously programmed.

The second scenario uses only the reactivation button to invoke a program feature such as scrolling. In this example, the intervals of continued operation ("holding down") and releasing the feature reactivation button may control the scroll amount, or holding down the feature reactivation button and dragging may provide a block-select-and-reactivate-feature operation in one step, such as previously described. When the reactivation button is used in this way, the pointer may be located anywhere on the screen except over any GUI control that can activate a program feature. The reactivation button is reprogrammed when it is clicked while the pointer is over a different GUI control that can activate a program feature. The reactivation button is reset when it is clicked while the pointer is over the same GUI control for which it was previously programmed.

There are multiple advantages of using the invention over the existing solutions. First, because the reactivation button is on the mouse (or other pointing device), the user can perform the three actions (maneuver the pointer, perform the selection, and activate the feature) with one hand and without hand relocation between keyboard and mouse. The existing solutions either require using two hands (one hand on the mouse to maneuver the pointer and to perform the selection, and the other hand on the keyboard to activate a feature) or requires the user to move on hand back and forth from the mouse to the keyboard to perform the three actions.

Second, because the reactivation button can be programmed quickly and intuitively the same way for many different application programs being used, such as word processors, spreadsheets, email clients, and browsers, the user is ensured of having the direct reactivation capability of any program feature. This reduces the cognitive load on the user to remember a great variety of hot key sequences and/or macro programming techniques.

Third, where some existing solutions provide a method of setting up a user defined key combination, the setup process involves multiple steps, while not all applications provide this customization capability. To program the reactivation button, the user simply moves the pointer over the well-known feature activation push button, menu item or other GUI control on the display, and clicks on the feature reactivation button.

Figure 6:
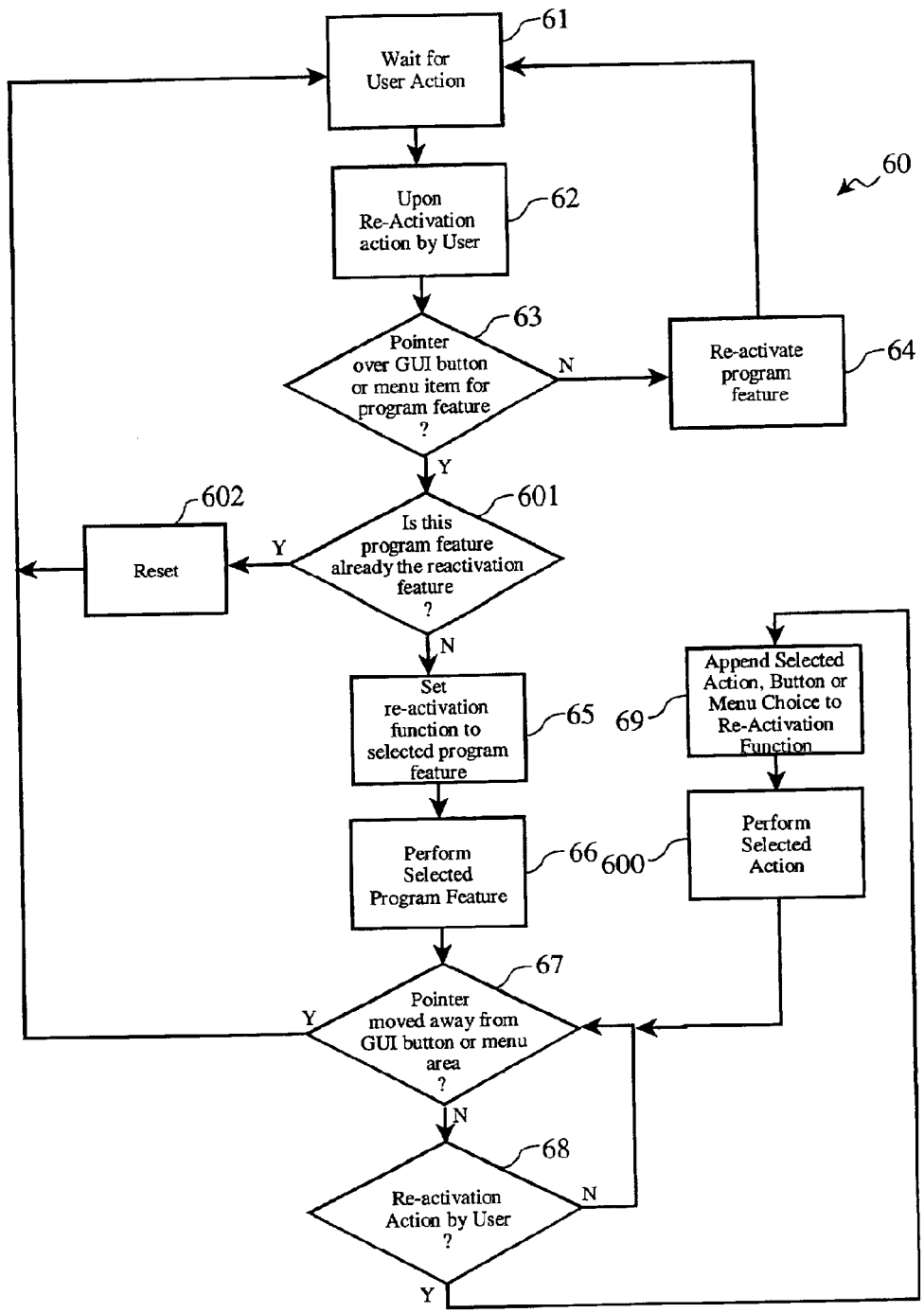
FIG. 6 depicts the logical process according to the invention.

Turning to FIG. 6, the process (60) of the invention is shown. The system such as a word processor waits for the user to take action with the pointing device such as a mouse. Upon selection of the feature reactivation button or key (62) by the user, the system determines whether or not the pointer on the screen is currently over a graphical user interface button or menu header (63). If it is not currently over such a graphical user interface button or menu header, then, the currently programmed feature for the feature reactivation button is executed (64). Then the system returns to a state of wait for the next user reactivation action (61).

When the user operates (62) the feature reactivation button or key with the pointer over (or pointing to) a graphical user interface control button or menu header (63), then the function of the feature reactivation button or key is programmed to be the system feature over which the pointer is currently located (65), if the selected program feature is not already the programmed reactivation feature (601). Then, the selected feature is executed (66).

If the program feature for the icon or button above which the reactivation button is already the programmed function of the reactivation button (601), then the function of the reactivation button may be reset (602), according to the preferred embodiment.

If the pointer is subsequently moved away from the graphical user interface button menu area (67), then the system returns to a state of wait for the next user feature reactivation button (61).

However, if the user operates the feature reactivation button or key again (68) while the pointer is still located over a graphical user interface button or menu header, then the selected system feature or action is attended to the currently programmed system features or actions of the reactivation key or button (69). This attending action allows for the user to define multiple system features to be executed by a single operation of the feature reactivation button or keys. For example, a user may move the pointer over a bolding button select that with the feature reactivation key, then move the pointer over the underlining control button, and select that system feature by pressing or operating the feature reactivation button. This will program the feature reactivation button to perform bolding and underlining of selected text.

Finally, as each system feature is attended to the program of the feature reactivation button, the selected system feature is also executed (600).

As can be seen by the given examples of italicizing multiple blocks of text, the user's actions and activities may be reduced as much as two-thirds in the number of steps and hand movements. This not only reduces fatigue to the user, and not only increases the efficiency or speed with which the user may operate the application program, it also reduces the number of errors caused by the user's hand movements and pointer movements to incorrect locations such as clicking on an incorrect icon or relocating the insertion point to the wrong position within the input text.

It will be recognized by those skilled in the art that certain modifications, substitutions, and alternate embodiments may be made to the disclosed examples without departing from the spirit and scope of the invention, including but not limited to adoption of alternate programming methodologies, computing platforms, and application programs. As such, the scope of the invention should be determined by the following claims.

What is claimed is:

1. A computing device, comprising:
   a graphical user interface display, said display having a user controllable pointer, a user input area and a user control area, said user control area containing one or more user selectable feature controls which, when selected, cause a system feature to be performed or otherwise activated; and
   a feature reactivation button having a first actuation mode when actuated while said pointer is pointed to a feature control, and a second actuation mode when actuated while said pointer is located in said user input area;
   wherein:
   when in the first actuation mode, the button assumes the functionality of the system feature which would otherwise be performed or activated by the feature control to which the pointer is pointing; and
   when in the second actuation mode, causes at least one system feature to be performed or activated which has been assumed in a previous first actuation mode.

2. The computing device as set forth in claim 1 wherein said feature reactivation button has a third actuation mode when actuated subsequent to actuation in said first actuation mode without an interceding second actuation mode wherein when in the third actuation mode said feature reactivation button appends to the currently assumed functionality the functionality of the system feature which would otherwise be performed or activated by the feature control to which the pointer is currently pointing, thereby allowing a sequence of system functions to be assumed by said button.

3. The computing device as set forth in claim 2 wherein said third actuation mode may be entered subsequent to actuation of said button in a previous third mode without an actuation of the button in said second mode, thereby allowing a sequence of multiple functions to be assumed by the button.

4. The computing device as set forth in claim 1 wherein said display is a computer display.

5. The computing device as set forth in claim 1 wherein said display is a telephone display.

6. A method for providing a system feature reactivation control for a computing device, said computing device having a graphical user interface display, said display having a user controllable pointer, a user input area and a user control area, said user control area containing one or more user selectable feature controls which, when selected, cause a system feature to be performed or otherwise activated, said method comprising the steps of:
   providing a first feature reactivation control actuation mode when said reactivation control is actuated while said pointer is pointed to a feature control, in which mode the reactivation control assumes the functionality of the system feature which would otherwise be performed or activated by the feature control to which the pointer is pointing; and
   providing a second feature reactivation control actuation mode when said reactivation control is actuated while said pointer is located in said user input area, in which mode at least one system feature is performed or activated which has been assumed in a previous first actuation mode.

7. The method as set forth in claim 6 further comprising the step of providing a third actuation mode when said reactivation control is actuated subsequent to actuation in said first actuation mode without an interceding second actuation mode, in which mode the functionality of the system feature which would otherwise be performed or activated by the feature control to which the pointer is currently pointing as appended to the functions already assumed by the reactivation control, thereby allowing a sequence of system functions to be assumed by said reactivation control.

8. The method as set forth in claim 7 wherein said third actuation mode may be entered subsequent to actuation of said reactivation control in a previous third mode without an actuation of the reactivation control in said second mode, thereby allowing a sequence of multiple functions to be assumed by the reactivation control.

9. A computer readable medium encoded with software for providing a system feature reactivation control for a computing device, said computing device having a graphical user interface display, said display having a user controllable pointer, a user input area and a user control area, said user control area containing one or more user selectable feature controls which, when selected, cause a system feature to be performed or otherwise activated, said software causing a processor to perform the steps of:

providing a first feature reactivation control actuation mode when said reactivation control is actuated while said pointer is pointed to a feature control, in which mode the reactivation control assumes the functionality of the system feature which would otherwise be performed or activated by the feature control to which the pointer is pointing; and providing a second feature reactivation control actuation mode when said reactivation control is actuated while said pointer is located in said user input area, in which mode at least one system feature is performed or activated which has been assumed in a previous first actuation mode.

10. The computer readable medium as set forth in claim 9 further comprising software for providing a third actuation mode when said reactivation control is actuated subsequent to actuation in said first actuation mode without an interceding second actuation mode, in which mode the functionality of the system feature which would otherwise be performed or activated by the feature control to which the pointer is currently pointing as appended to the functions already assumed by the reactivation control, thereby allowing a sequence of system functions to be assumed by said reactivation control.

11. The computer readable medium as set forth in claim 10 wherein said software for providing a third actuation mode is adapted to enter said third actuation mode may subsequent to actuation of said control in a previous third actuation mode without an actuation of the control in said second mode, thereby allowing a sequence of multiple functions to be assumed by the button.

* * * * *